Dec. 15, 1931.  F. G. WITHROW  1,836,353
CUSHION SUPPORT
Filed Jan. 20, 1927   4 Sheets-Sheet 1
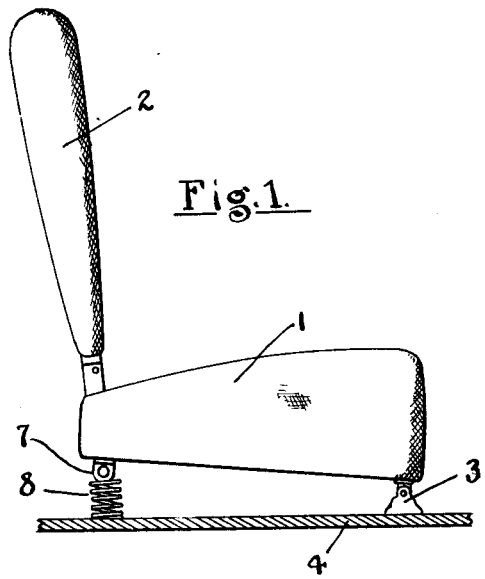
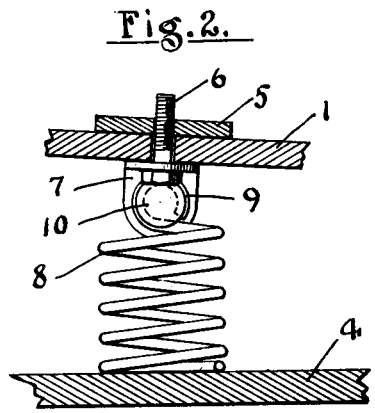
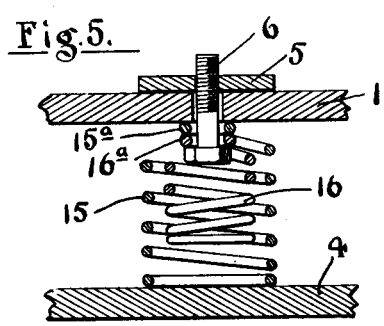
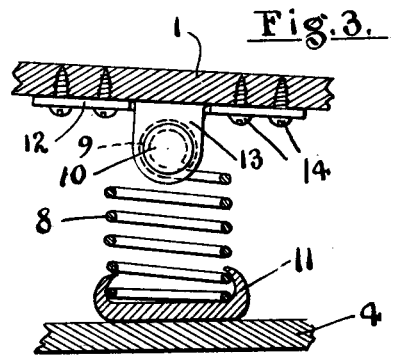
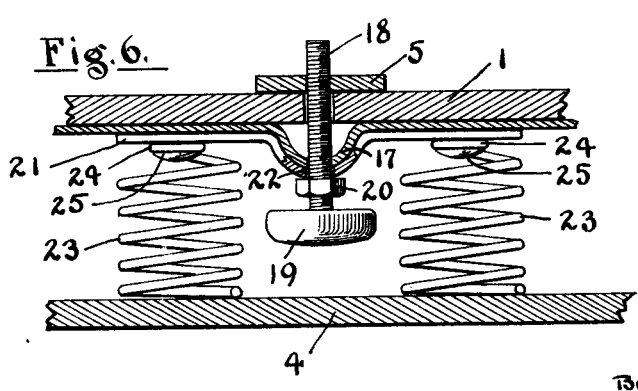
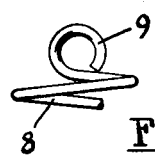
Inventor
Floyd G. Withrow
By Frank E. Liverance, Jr.
Attorney.

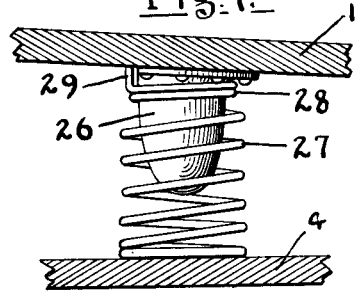
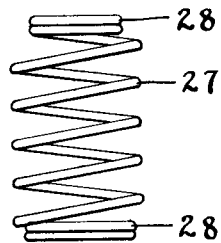
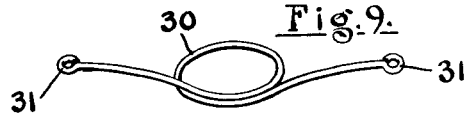
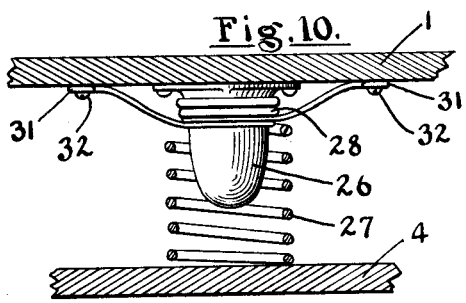
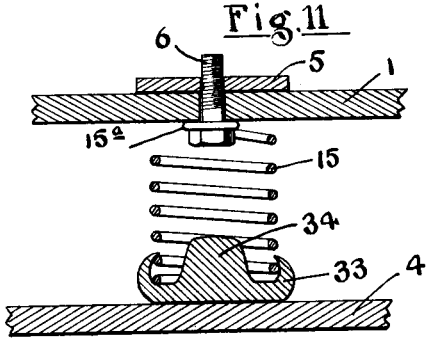
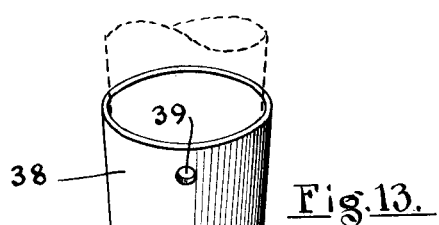
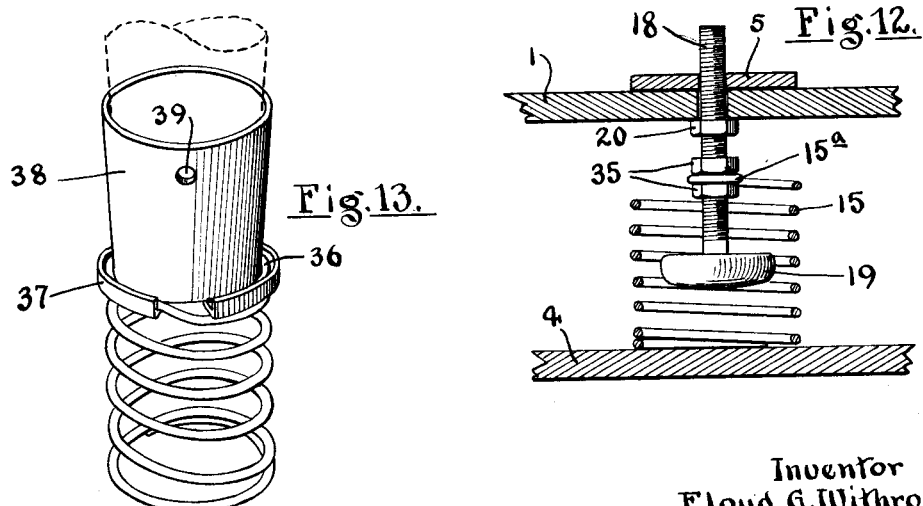

Dec. 15, 1931.  F. G. WITHROW  1,836,353
CUSHION SUPPORT
Filed Jan. 20, 1927   4 Sheets-Sheet 3

Inventor
Floyd G. Withrow
By Frank E. Liurance, Jr.
Attorney.

Dec. 15, 1931.　　　F. G. WITHROW　　　1,836,353
CUSHION SUPPORT
Filed Jan. 20, 1927　　　4 Sheets-Sheet 4
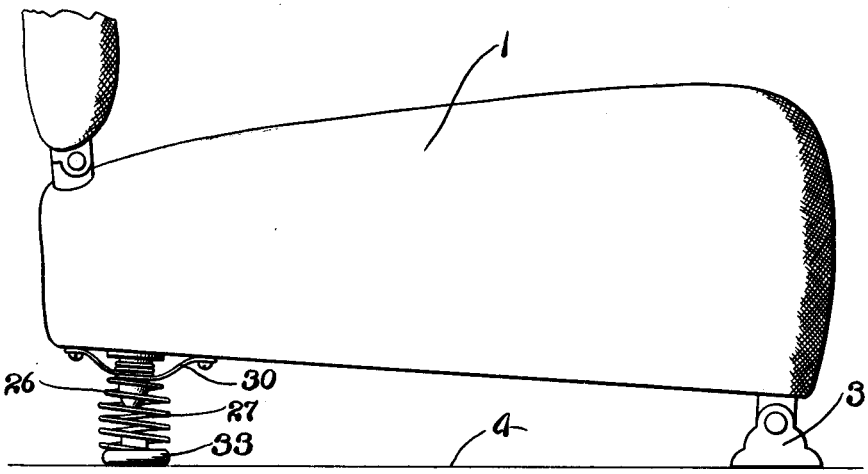
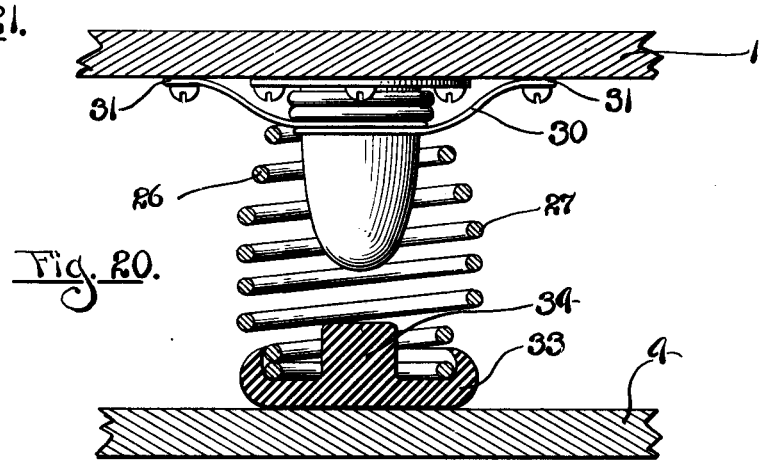
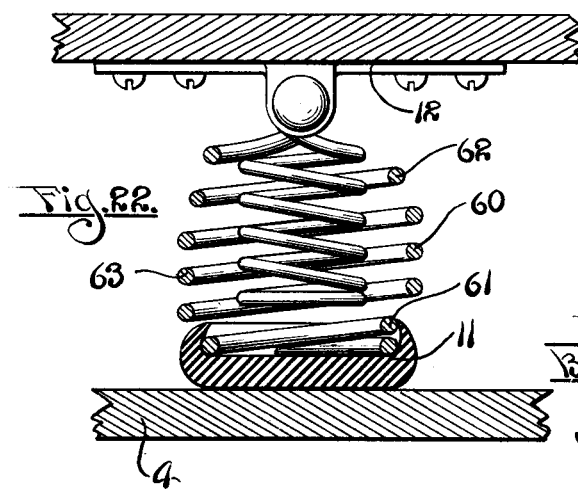
Inventor
Floyd G. Withrow
By Frank E. Liveravel, Jr
Attorneys Patented Dec. 15, 1931

1,836,353

UNITED STATES PATENT OFFICE

FLOYD G. WITHROW, OF GRAND RAPIDS, MICHIGAN

CUSHION SUPPORT

Application filed January 20, 1927. Serial No. 162,242.

This invention relates to improvements in cushion springs for vehicle seats. Certain types of automobiles now commonly in use are provided with pivoted seats, that is the seat is pivotally connected at one edge, usually the front edge, to the floor and its rear edge may be raised for the purpose of getting the seat out of the way. The rear or free edge of the seat is supported by one or more legs projecting from the under side of the seat and engaging the floor.

The object of this invention is to provide a cushion spring to support the movable edge of the seat in the place of the usual leg, such spring support absorbing a great deal of vibration of the car and affording much comfort to the occupant. The spring conceived by this invention is in the nature of an attachment which may be either substituted for the usual leg or may be attached to it. The invention provides a cushion spring attachment which may be easily applied to the automobile seat, which may be readily adjusted for angularity of the seat relative to the floor and which will be substantial and effective in operation.

The invention provides various novel features of construction and arrangement of parts hereinafter more fully described and particularly pointed out in the claims, reference being had to the accompanying drawings, in which, Fig. 1 is a side elevation of an automobile seat of conventional design, pivotally attached at its front edge to the floor of the vehicle and having a cushion spring embodying this invention applied to its rear edge.

Fig. 2 is an enlarged elevation of the spring shown in Fig. 1.

Fig. 3 is a modification thereof in which the cushion foot is added and a different attaching means provided.

Fig. 4 is a fragmentary detail showing the construction of the upper end of the spring illustrated in Figs. 2 and 3.

Fig. 5 is another form of spring support in which an additional spring is used as a cushion stop member.

Fig. 6 shows a dual spring structure applied to a certain type of seat structure.

Fig. 7 shows a cushion spring adapted to be applied to a conventional form of rear supporting leg.

Fig. 8 is a modified form of the structure shown in Fig. 7.

Fig. 9 is a perspective view of a spring attaching clip.

Fig. 10 shows a cushion spring held in place by the clip shown in Fig. 9.

Fig. 11 illustrates a cushion spring having a combined foot member and limiting stop.

Fig. 12 shows a cushion spring applied to the conventional leg of the seat.

Fig. 13 shows a cushion spring applied to a ferrule by means of which it may be readily attached to the leg of a vehicle seat or to any article of furniture.

Fig. 20 shows a combined arrangement of the previously mentioned devices.

Fig. 21 shows the device of Fig. 20 applied to an automobile seat, and the springs.

Fig. 22 illustrates another one of the many possible combinations obtainable.

Like reference characters refer to like parts in the different figures of the drawing.

Figure 14:
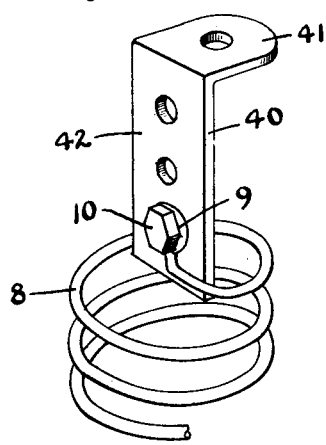
Fig. 14 shows a cushion spring similar to that of Figs. 2 and 3 with a modified form of attaching member.

1 represents the conventional vehicle seat having a back 2 which is usually pivoted to the seat and adapted to fold down upon it. The seat is pivotally connected at its front ward edge by brackets 3 to the floor 4 of the vehicle. The spring structure shown in Fig. 2 is adapted to be substituted for the leg at the rear of the seat structure where the leg is threaded and screwed into a plate 5 on the seat structure. In this device the screw 6 is substituted for the screw threaded leg which is removed and the screw is screwed into the plate 5 and holds an angular clip 7 against the under side of the seat. The cushion spring 8 which is of the usual so-called coiled spring or helical shape, has its upper end formed into an eye 9 which is turned in a vertical plane and lies against the vertical member of the clip 7, being pivotally held in place by a bolt or rivet 10.

It will be noted that the bottom of the seat assumes an angular relation to the floor and by means of the pivotal connection of the upper end of the spring with its attaching clip, the spring may be turned to squarely engage the floor which is desirable.

The spring 8 of Fig. 3 is similar to the spring of Fig. 2 but it has a cushion foot 11 applied to its lower end, this foot preferably being formed of rubber or an analogous compound or material and is of cup shape, its upper edges being elastic and gripping the lower coils of the spring. The attaching member of this spring comprises a plate 12 having one or more downturned ears 13 to which the eye 9 of the spring is attached by a bolt or rivet 10 similar to that of Fig. 2. This type of attaching bracket is intended to be used with wood screws 14 in seat structures which are not provided with the screw threaded plate 5 for a screw 6.

The spring structure shown in Fig. 5 is attached by a screw 6 to the plate 5 of the seat structure similar to that of Fig. 2. The spring structure of this form comprises the outer cushion spring 15 of the usual coiled shape and the inner smaller coiled spring 16. Each of these springs has an eye 15a and 16a respectively, formed at its upper end and in a horizontal plane or parallel with the bottom of the seat and the screw 6 is inserted through both eyes and holds both springs in operative position.

The outer spring is longer and more yieldable than the inner spring and serves to support the weight of the seat and occupant under normal conditions, but exceptional weight upon the seat will compress the outer spring 15 until the inner spring engages the floor and the combined acttions of the two springs will then serve to support the seat from further depression. In other words the inner spring serves as a cushion stop member to yieldably limit the movement of the seat beyond normal position.

The spring structure shown by Fig. 6 is intended to be applied to a vehicle seat constructed with a rib 17 on its lower surface. Such seats are ordinarily provided with a screw threaded leg 18 which extends through a hole in the rib 17 and is screwed into the plate 5 in the seat structure. The lower end of the leg is provided with a foot 19 and a nut 20 is provided on the screw threaded portion of the leg whereby its height may be adjusted. The cushion spring attachment for this type of seat comprises the plate 21 having an inverted arch at its center to fit over the rib 17 of the seat and a hole 22 in the arch to register with the hole in the rib. Each respective end of the plate 21 is provided with a coiled cushion spring 23 having an eye 24 at its upper end which lies parallel with and against the plate 21 and is attached to the plate by means of a rivet 25.

It is intended to apply this structure to the seat by utilizing the leg 18, adjusting its nut 20 thereon to bear against the arch of the plate 21 and hold it in position with the foot 19 raised from the floor which is engaged by the springs 23. The arch of the plate fits over the rib 17 of the seat and prevents the plate from turning on the seat. The foot 19 of the leg serves as a limit stop to stop the seat in its downward movement when the springs have been compressed beyond their normal position.

Some styles of automobile seats are provided with legs 26 of dome shape and for attachment to legs of this type it has been found practical to utilize a coiled spring 27 with its upper coils 28 restricted in diameter so that they will normally be slightly smaller than the diameter of the leg and may be forced over the leg, their resiliency permitting them to expand and grip the leg and hold the spring tightly in place thereon.

When this type of cushion spring is used with a seat which has its bottom angularly disposed relative to the floor it is desirable to provide an upturned finger 29 on the upper restricted coil of the spring, this finger engaging the under side of the seat at its high side and causing the spring to assume a position on the leg substantially vertical with the floor. In the absence of this finger the top coils of the spring would assume a position parallel with the bottom of the seat and therefore the spring would not engage the floor squarely as it should.

The spring structure shown by Fig. 8 is adapted to be applied to the leg 26 of a seat, as shown in Fig. 7, but each of its ends is provided with restricted coils and the coils of each end are slightly different in diameter, the coils of one end being made to fit the leg of a seat of one automobile while the coils of the other end are of a proper size to fit the seat of another automobile. This structure may be interchangeably used on the legs of the seats of two different automobiles without change. Its advantage is that the accessory dealer who sells these devices is enabled to supply cushion springs for two different machines by only carrying in stock one kind of spring. It will be noted that the reduced end of the spring which engages the floor is suitably shaped for that purpose.

The spring shown in Fig. 10 is intended to be applied to the same type of leg 26, shown in Fig. 7, but its inner coils 28 are not necessarily restricted in size sufficiently to grip the surface of the leg. A loop shaped clip 30 having radially extending ends provided with eyes 31 is provided to hold the spring in place on the leg. The loop of this clip surrounds the leg below the upper coils 28, of the spring and screws 32 are inserted through the eyes 31 into the bottom of the seat.

The spring shown in Fig. 11 is similar to the outer spring 15 of Fig. 5 and is attached by a screw 6 passing through its eye 15a and into the plate 5 of the seat. The foot 33 of this spring has an upward extending dome or bumper portion 34 within the coils of the spring and is engaged by the head of the screw 6 when the spring is compressed beyond normal. The foot 33 and its bumper portion 34 are preferably made of rubber or some analogous resilient material. The rim of the foot is elastic and is retained upon the lower coils of the spring by its elasticity.

The spring of Fig. 12 is identical with that of Fig. 11 and may be attached to the usual leg of certain types of automobiles in which the leg 18 is screw threaded as in Fig. 6 and has a foot 19 and a nut 20 for adjusting its height. When used in this way the leg 18 is inserted through the eye 15a of the spring and the nuts 35 are provided to be screwed onto the leg 18 below the nut 20, one on each side of the eye 15a. By this means the spring may be attached to any desired position on the leg and the leg may be adjusted as to height by its nut 20 engaging the bottom of the seat. It is intended that the spring be adjusted upon the leg so that the foot 19 is elevated from the floor and the foot is intended to engage the floor and stop the movement of the seat when the spring has been compressed the normal amount.

The coiled spring of Fig. 13 has its upper coil 36 arranged within an annular channel 37 at the lower end of a ferrule 38 thereby attaching the spring to the ferrule. The ferrule may be applied to a leg such as 26 of a vehicle seat by inserting the leg into it or it may be applied to other articles of furniture such as the leg of a chair. The ferrule may be retained upon the leg by friction or it may be held in place by inserting a screw or bolt through the hole 39.

The spring of Fig. 14 is identical with that of Figs. 2 and 3. The attaching bracket 40 of this structure is an angular member having a horizontal portion 41 with a hole through which the screw 6 may be inserted to hold it to the lower surface of the seat and the vertical portion 42 having a plurality of holes at different elevations through either of which the bolt 10 may be inserted to regulate the extension of the spring from the bottom of the seat. This structure also provides the pivotal feature whereby the spring may be properly aligned with the floor.

Figure 15:
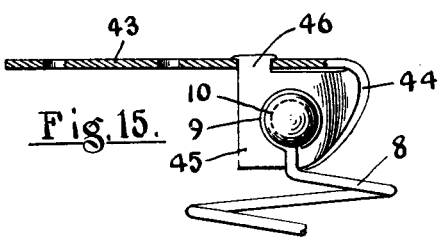
Fig. 15 is a fragmentary detail partly in section showing a modified attaching bracket used with the spring of Fig. 14.
Figure 16:
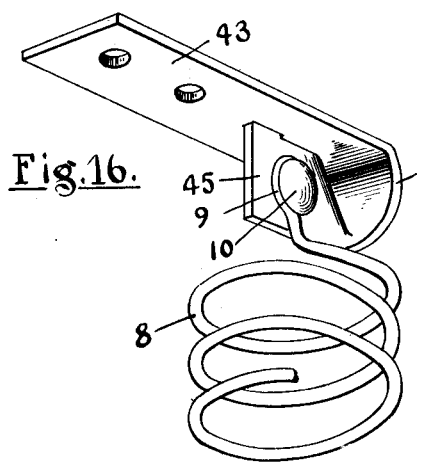
Fig. 16 is a perspective view of the parts shown in Fig. 15.

The structure of Figs. 15 and 16 utilizes the same spring 8 of Fig. 2, the attaching bracket being formed of sheet metal having a flat horizontal body portion 43 which is bent downwardly at 44 and twisted into vertical position at 45 under the body portion. A prong 46 is provided on the veretical member which extends through an opening in the horizontal portion and is riveted to hold the vertical portion rigidly in place. The eye 9 of the spring is pivotally attached to the vertical portion by the bolt 10 which extends through them both. The horizontal body portion 43 is attached by screws to the under surface of the seat.

Figure 17:
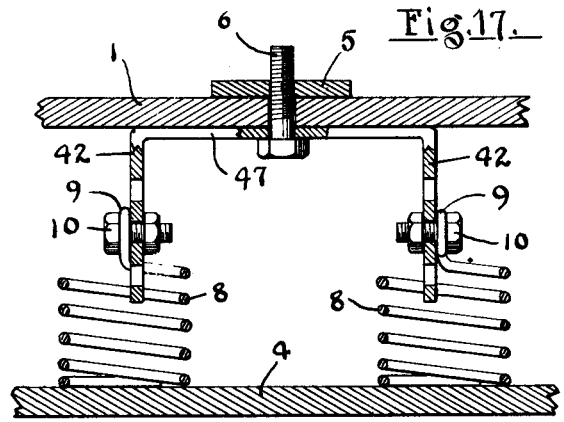
Fig. 17 illustrates the dual mounting of the type of spring and support shown in Fig. 14.

The bracket of Fig. 17 is similar to that of Fig. 14 excepting that its horizontal portion 47 extends in both directions from its screw hole and each end is turned downwardly to form an enlongated vertical member 42, each provided with a plurality of openings to receive the bolt 10 by means of which a spring 8 may be attached by its eye 9 to each bracket.

Figure 18:
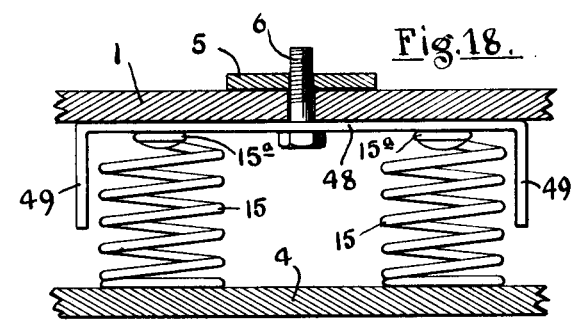
Fig. 18 is a dual spring structure having a stop member. The outer spring is the same as the outer one of Fig. 17.

Fig. 18 shows an attaching bracket having a flat horizontal portion 48 with a screw hole near its center whereby it may be attached to the lower surface of the seat by a screw 6. The respective ends of the bracket are turned downwardly to form relatively short legs 49 and two cushion springs 15 similar to those of Fig. 11 are attached by rivets to the body portion 48 near its respective ends. By means of this structure the springs, which extend below the legs 49, normally support the seat but the seat is stopped in its downward movement by engagement of the legs 49 with the floor when the springs are abnormally compressed.

Figure 19:
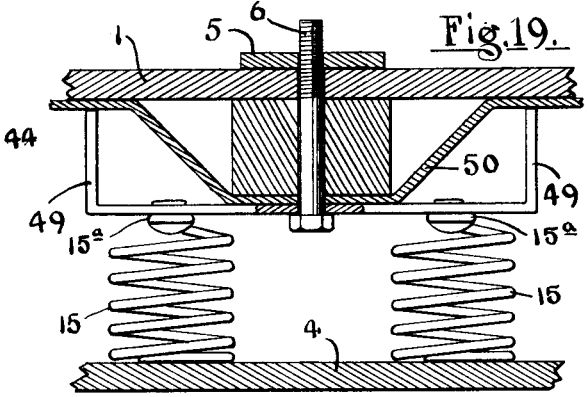
Fig. 19 illustrates the same parts as shown in Fig. 18 with the attaching member reversed to adapt it to certain seat structures.

The structure of Fig. 19 utilizes the same bracket and springs as that of Fig. 18 but the bracket is inverted so that the legs 49 extend upwardly therefrom. This structure is used with seats having a rib 50 on their under surfaces. The bracket is attached to the rib and the legs support the respective ends of the bracket by engaging the under surface of the seat at the sides of the rib.

The structure of Figs. 20 and 21 discloses the foot 33 and its bumper 34, see Fig. 11, a helical spring 27 adapted to be received in the lip on the bumper and a clip 30, with eyes 31, adapted to maintain the spring structure fastened to the hinged seat 1. Also, the upper constricted portion of the coiled spring tightly engages the leg 26 of the seat.

Fig. 22 shows a resilient foot member 11, see Fig. 3, adapted to receive the lower end 61 of the coiled spring 60, the upper portion 62 of this spring terminating in an eye fastened to the bracket 12. Also, a bumper spring 63 has an eye fastened adjacent to the first eye.

Having thus revealed this invention, I claim as new and desire to secure the following combinations and elements by Letters Patent of the United States.

I claim:

1. In combination with a stationary member and a member movable relative thereto, one of said members having a short leg extending therefrom, of a cushion member, said cushion member comprising a coiled spring adapted to encircle the leg, means for holding the spring in its encircling position, a rubber foot adjacent the free end of the coiled spring, and means for fastening the rubber foot to the spring, said foot having an integral projection extending interiorly of the coiled spring, said projection being adapted to contact with the end of the leg upon compression of the coiled spring.

2. A combination cushion and bumper member adapted to fit over the end of a helical spring comprising a cup shaped member formed of rubber, a bumper portion formed with the said member and extending interiorly of the spring, said outer walls of the cup shaped member being adapted to tightly grip the spring therewithin.

3. In a seat having a depending leg the combination of a coiled spring adapted to surround said leg, an attaching clip comprising a looped member also surrounding said leg and interengaging with the spring, and means on said attaching clip to fasten it to the aforesaid seat.

In testimony whereof I affix my signature.

FLOYD G. WITHROW.